United States Patent [19]

Szkaradnik

[11] Patent Number: 4,717,233
[45] Date of Patent: Jan. 5, 1988

[54] OPTICAL FIBER SPLICE SYSTEM

[75] Inventor: Edmund J. Szkaradnik, Philadelphia, Pa.

[73] Assignee: TRW Inc., Redondo Beach, Calif.

[21] Appl. No.: 562,394

[22] Filed: Dec. 15, 1983

[51] Int. Cl.$^4$ .............................................. G02B 6/38
[52] U.S. Cl. .............................. 350/96.21; 350/96.20
[58] Field of Search .......................... 350/96.20, 96.21; 156/153

[56] References Cited

U.S. PATENT DOCUMENTS

| | | | |
|---|---|---|---|
| 4,192,575 | 3/1980 | Hodge | 350/96.21 |
| 4,353,619 | 10/1982 | Parr | 350/96.21 |
| 4,377,323 | 3/1983 | Schneider | 350/96.21 |
| 4,418,983 | 12/1983 | Bowen et al. | 350/96.21 |
| 4,506,946 | 3/1985 | Hodge | 350/96.21 |

OTHER PUBLICATIONS

Bark et al., "Field Splicing . . . Reflectometry", Proc. First Intl. Fiber Optics & Commun. Expo.
U.S. Application Ser. No. 968,045, filed on 12/08/78 by Hodge.
"AMFOX Splice-of-Light® Optical Fiber Splicing Kit" brochure.
"GTE Elastomeric Splice" brochure.
"Mekconlite Butt Splice Assembly New Model BSAX" brochure.
Siecor, Mechanical Splicer, Part No. M-61.

Primary Examiner—James W. Davie
Assistant Examiner—Robert E. Wise
Attorney, Agent, or Firm—Jeffery G. Sheldon; Shlomo R. Frieman; Sol L. Goldstein

[57] ABSTRACT

A splice connector for optical fibers comprises a guide having a fiber-receiving channel and an alignment cradle having an intermediate section with a channel for holding the guide in position to receive optical fibers. The fibers are bonded together in the guide with a UV-curable adhesive. The alignment cradle also holds a pair of flexible sleeves that are placed on either side of the guide and serve to protect the spliced fibers from vibrations and other environmental stresses. A metallic housing can be crimped over the splice. Also described is a fixture for making the splice. The fixture holds the alignment cradle, guide, and spliced fibers in position, while the adhesive used for making the splice cures.

4 Claims, 10 Drawing Figures

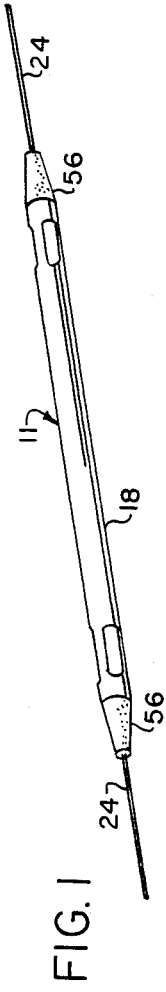
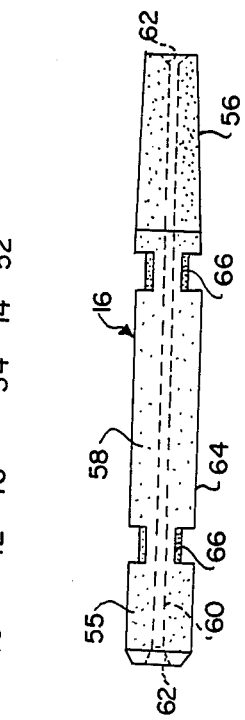
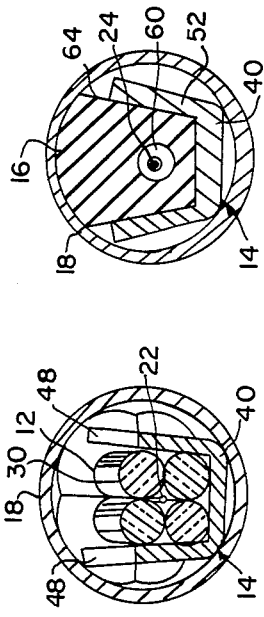
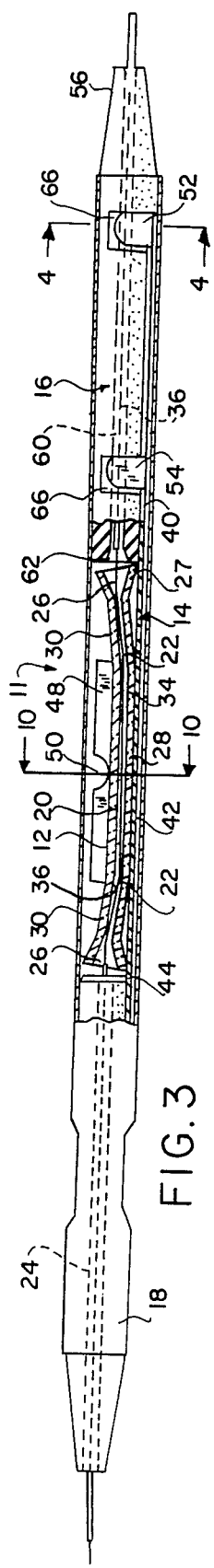
FIG. 1  FIG. 2  FIG. 5  FIG. 3  FIG. 4  FIG. 10

OPTICAL FIBER SPLICE SYSTEM

BACKGROUND

This invention relates to systems for splicing optical fibers together.

The technology of optical fiber data transmission systems has advanced rapidly and it is anticipated such systems will gain substantial acceptance in various applications such as telephone, CATV, long and short haul data transmission, industrial process controls, aerospace, and marine communication. Optical fibers commonly comprise a central light transmitting core and a glass or polymeric cladding. A protective coating usually surrounds the fiber.

Fiber optic systems often require connection or splicing between fibers. It is important that connection between fibers be made precisely and securely to minimize coupling inefficiency, i.e. loss of light at the joint interface. Improper splicing can result in lateral core misalignment, angular misalignment, and end separation, all of which cause loss of light. For example, transverse or lateral misalignment of the ends of the fibers with respect to each other results in a substantial signal loss across the interface which increases with increasing lateral displacement, e.g., approximately 4 db with a lateral displacement equal to about one-half of the fiber diameter. Similarly, longitudinal separation of the fiber ends also results in a substantial signal loss which increases with increasing end separation, e.g., approximately 1.5 db with an end separation of one-half the fiber diameter. Axial or angular misalignment also contributes to coupling inefficiency with loss increasing as the angle between the end faces of the optical fibers increases, e.g., a loss of approximately 1 db for a 5 degree angle. Thus signal loss is introduced by transverse displacement, end separation, and axial misaslignment. Accordingly, it is very important to form a coupling where the fiber ends are transversely and axially aligned and are in intimate abutment with each other.

Prior art techniques for coupling fibers are described in U.S. Pat. No. 4,192,575 which is incorporated herein by this reference. A difficulty experienced with many art techniques is that they are not field effective. In a laboratory with an endless amount of time, it is possible to make practically perfect splices. However, a worker in the field needs to be able to make splices quickly, effectively, and efficiently and without using equipment that can only be found in a laboratory.

Thus, there is a need for a system that can be used to effect a low loss splice between a pair of optical fibers, where the system is useable in the field in an easy, effective, and efficient manner.

SUMMARY

The present invention satisfies this need. According to the present invention, a connector for splicing a pair of optical fibers together includes four elements: a guide, an alignment cradle, and two flexible sleeves. The guide has a fiber-receiving channel extending therein for guiding the fibers in an end-to-end relationship. The alignment cradle has end sections and an intermediate section between the end sections. The intermediate section has means for holding the guide in position to receive the optical fibers. The holding means can be upstanding walls that form a channel for receiving the guide. Preferably the guide is preplaced in the holding means and supplied to the user so assembled.

The flexible sleeves are designed for placement in a respective one of the end sections of the cradle. Each sleeve has a fiber receiving channel therethrough. The sleeves protect the fibers from damage due to bending and other stresses incurred during the splicing of the fibers and in use. Preferably the connector also includes an external tubular housing sized to fit over the assembled guide, cradle, sleeves and optical fibers.

To use the connector to form a splice between fibers, a flexible sleeve is placed over each of the fibers. The tubular housing is then fitted over one of the fibers. The protective coating is removed from the end portion of each fiber leaving the exposed fiber. To connect the exposed fibers together in end-to-end relationship, they are slid into the guide, which is preplaced in the alignment cradle. The fibers are bonded into the guide and then the flexible sleeves are slid over their respective fibers and placed in a respective end section of the alignment cradle. The housing is slid over the assembled fibers, guide, sleeves, and alignment cradle and crimped in place with an end of each sleeve extending beyond the corresponding end of the housing.

Preferably the connector includes means for locating the sleeves in a predetermined position in the cradle. For example, the cradle can include at least one pair of opposed tabs at each end section and the sleeves can have corresponding indents in their outer wall.

Preferably the fibers are bonded together with a UV-curable adhesive. Such adhesives cure in about five minutes and do not require mixing of components.

An important feature of this system for splicing optical fibers is a special jig or fixture that permits excellent splices to be quickly and repeatedly made. The fixture includes a base having side sections and a middle section between the side sections, with a retaining block at each side section of the base. Each retaining block includes an extension extending over and spaced apart from the base forming a slot shaped opening for receiving the end sections of the cradle. In use of the jig, the cradle is placed on the base with the end sections in the slots. A holding means such as a spring clamp engages the intermediate section of the cradle to fixedly hold the cradle in position on the base. With the cradle so held, the guide remains in a locked position which permits the very small fibers to easily be placed in the guide. Further, to assure that the cradle is properly located: (1) the retaining blocks can have a hole for receiving the cradle tabs; and (2) the clamp can be U-shaped with arms spaced apart from each other by a distance slightly greater than the length of the channel walls.

Preferably each retaining block of the jig includes a clamp for clamping an optical fiber in place once the bonding material is applied to the fibers. Thus, while the adhesive is being cured, movement of the fibers relative to each other is avoided.

Thus, the splicing system of the present invention provides a splice, a method, and a fixture for splicing a pair of optical fibers together efficiently, effectively, and easily.

DRAWINGS

These and other features, aspects, and advantages of the present invention will become better understood with reference to the following description, appended claims, and accompanying drawings where:

FIG. 1 is a perspective view of a splice of two optical fibers, the splice being prepared in accordance with the present invention;

FIG. 2 is an exploded plan view of the splice connector used to form the splice of FIG. 1;

FIG. 3 is a front plan view, partly in longitudinal section, of the splice of FIG. 1;

FIG. 4 is a transverse sectional view of the connector of FIG. 2 taken on line 4—4 in FIG. 3;

FIG. 5 is a bottom plan view of the sleeve of the connector of FIG. 2 taken on line 5—5 in FIG. 2;

FIG. 10 is a transverse sectional view of the cradle of the connector of FIG. 2 taken on line 10—10 in FIG. 3.

DESCRIPTION

Figure 6:
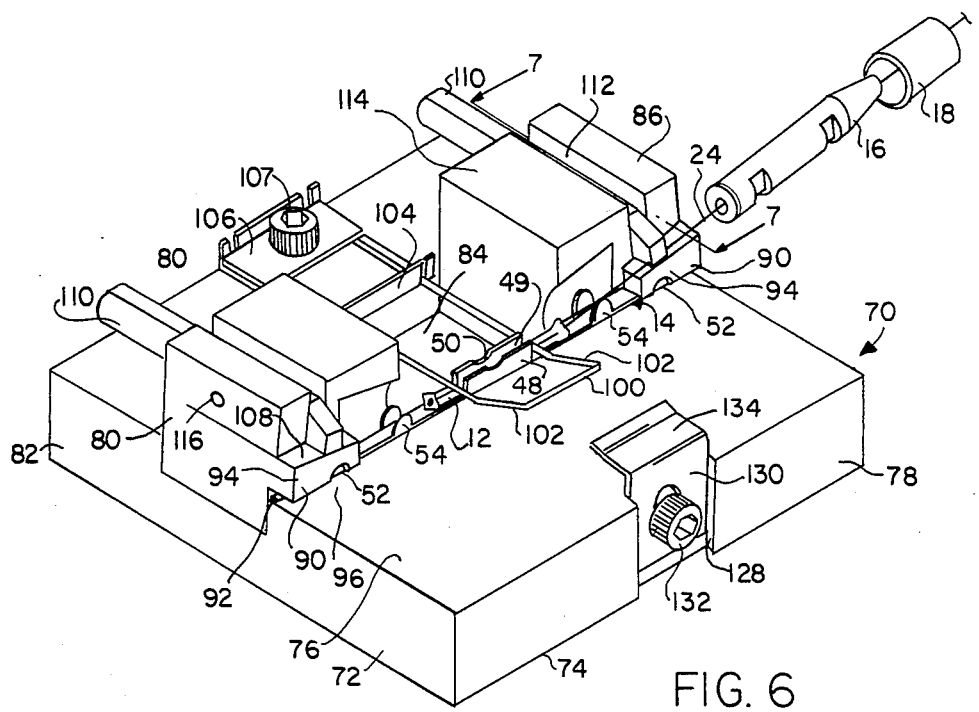
FIG. 6 is a perspective view of a fixture or jig useful for forming the splice of FIG. 1 showing the splice of FIG. 1 partly assembled.

The present invention is directed to (i) a splice connector for optical fibers, (ii) a splice made with the splice connector, (iii) a method for making the splice, and (iv) a tool useful for making the splice. The present invention is useful for a wide variety of optical fibers in a wide range of sizes, including from 50 to 200 millimicrons. Optical fibers commonly have a glass core with a glass or polymeric cladding on and around the core.

With reference to FIGS. 1–4, a splice connector 11 according the present invention comprises as its main components a guide 12, an elongated alignment cradle 14 for holding the guide 12, a pair of flexible sleeves 16, and a metallic crimp housing 18.

Figure 9:
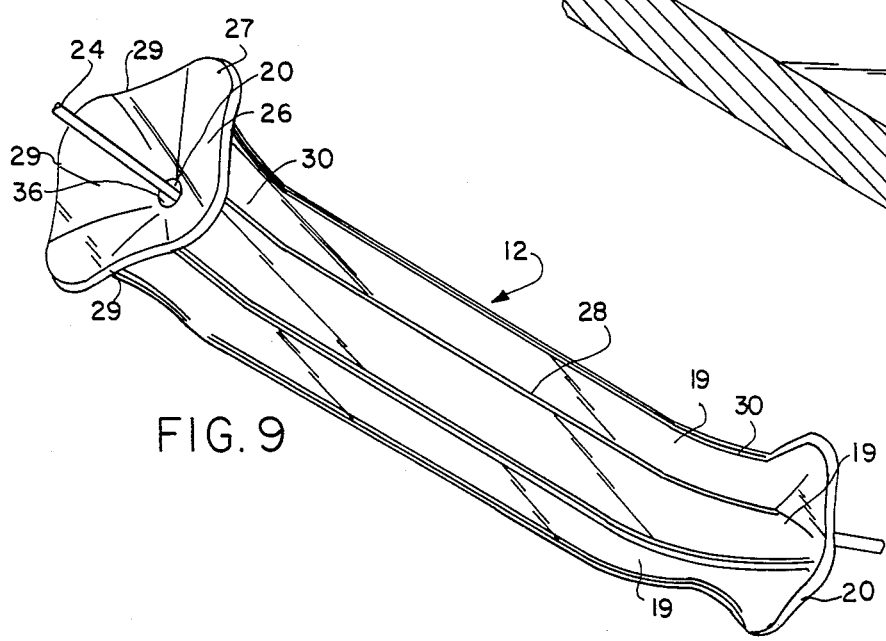
FIG. 9 is a perspective view of the glass guide of the splice connector of FIG. 2.

The preferred guide 12 used in the present invention is described in U.S. patent application Ser. No. 968,045 filed on Dec. 8, 1978, by Malcolm H. Hodge, now U.S. Pat. No. 4,506,946, which is incorporated herein by this reference. As shown in FIG. 9, such a guide member comprises at least three, and preferably four, identical elongated, rod-shaped glass members 19 disposed in a side-by-side parallel array with longitudinal portions abutting and integrally connected. The array of rod-shaped members forms a central interior space or channel 20 sized to receive the bare fibers 22 of two coated optical fibers 24. The channel 20 is arranged to receive the ends of the optical fibers 24 to be joined to align them co-axially. The particular diameter of the rod-shaped members 19 is selected so the diameter of the central portion of the channel 20 formed therebetween is just slightly larger than the diameter of the bare fibers 22 of the coated fibers 24 to be joined.

Preferably the guide member 12 is formed of glass by drawing large diameter glass rods down to the required size and into contact with each other while hot, so that the longitudinal portions of the peripheral edges contact and fuse together. Significant advantages are obtained from use of the guide 12. Glass is generally unsusceptible to shrinkage, thereby insuring dimensional stability. In addition, the glass provides a hard, yet smooth surface which is abrasion and corrosion resistant. These features insure that the bare fibers 24 are not scored, scraped, or otherwise damaged when inserted in the guide, nor will the guide be damaged, either of which occurrence could result in light loss. Further, the transparency of the clear glass guide member 12 enables the viewing of the positioning of the fiber ends, thereby facilitating the connection of the fibers.

In order to facilitate the insertion of small diameter optical fibers into the channel 20 of the guide member 12, each open end 26 of the guide is of a greater cross-sectional area than the remaining portion of the channel 20, as shown in FIG. 3. The enlargement of the openings is preferably formed by heating the ends of the guide member and inserting a tapered pin to form a flared end 27 having generally straight peripheral edges 29.

Preferably the glass forming the guide member 12 is selected to have the same refractive index as the cladding of the fiber 24 to reduce light losses along the fiber.

Preferably the guide 12 is a double elbow end guide. This not only insures that the ends of a pair of optical fibers are precisely aligned angularly as well as axially, but also insures that the fiber ends are not damaged in the event that an attempt is made to push the fibers further into the guide once their ends have met as described in the aforementioned application Ser. No. 968,045. As can be seen in FIGS. 3 and 9, the guide 12 includes a straight, central or mid-portion 28 and a pair of end portions 30. The end portions 30 are identical and each extends at an obtuse angle to mid-portion 28 so that the guide's channel 20 includes a straight mid-portion 34 and a end portions 36; each end portion 36 extends at an obtuse angle to the mid-portion 34.

The angularly extending end portion 36 of the channel 20 and the straight mid-portion 34 of the channel 20 cooperate to bias the fibers 24 of a pair of fibers inserted through the respective end of the channels to align in end-to-end relationship in the channel 20 formed by the glass rods.

The bottom peripheral edge 29 of the flared ends 27 of the guide 12 and the bottom of the mid-portion of the cradle 14 are co-planar, i.e. the guide 12 can sit on a flat surface supported by the mid-portion and the two ends of the guides with the angled portions of the guide spaced apart from the flat surface, as shown in FIG. 3.

The cradle 14 comprises an elongated, thin, flat base 40 that is substantially longer in length than the length of the guide 12. The cradle has a central mid-portion 42 and two identical end portions 44. The mid-portion 42 has a pair of upstanding, opposing side walls 48 extending upwardly from the base 40 forming a channel 49 for receiving the guide 12. As shown in FIG. 10, the side walls 48 flair outwardly from the base 14 at an angle of about 3 degrees so that the width of the channel 49 between the side walls is greater at its top than at its base. The width of the channel 49 at its base is slightly less than the width of the glass guide 12 so that the glass guide is firmly held and cradled within the side walls 48. The length of the side walls 48 is less than the length of the glass guide so there is easy access to the ends of the glass guide.

At the center top portion of each side wall 48 there is a small semi-circular cutout 50. This cutout helps the user of the splice connector 11 to easily view the ends of the fibers 22 as they are spliced together and identifies the center of the splice connected.

Preferably the cradle 14 is made of a resilient material so that the glass guide 12 can be firmly cradled without breakage. Thus, preferably the cradle 14 is made of a resilient metal such as a copper alloy, and preferably copper alloy C19400.

Both end sections 44 are provided with two pairs of upstanding tabs, a pair of tabs 52 at the very ends of the end sections 44, and a pair of intermediate tabs 54 about halfway between the end tabs 52 and the middle of the cradle 14. The tabs of each pair are spaced apart and are parallel to the longitudinal axis of the cradle 14, and as best shown in FIG. 4, flair outwardly at an angle of about 10 degrees from the base much as the side walls 48 flair out. As discussed in detail below, the tabs 52 and 54 hold the flexible sleeve 16 in position and position the cradle 14 and glass guide 12 when assembling a splice.

The two flexible sleeves 16 are generally tubular in shape, each having one end 55 that is circular in transverse cross-section and an opposite end 56 that is tapered with a frustoconical shape. The sleeves 16 have a flat bottom 58 so they can sit against the flat base 40 of the cradle 14. The sleeves 16 have a longitudinal channel 60 extending therethrough for placement of an optical fiber 24 and are sufficiently large to accommodate a fiber 24. Both ends 62 the channel 60 are enlarged for ease in threading a fiber into the channel 60.

The side walls 64 of each sleeve 16 have two corresponding indents 66 corresponding to the tabs 52 and 54 of the cradle 14 for locating the sleeves in the cradle. The sleeves are sufficiently long so that the tapered end 56 extends beyond the ends of the cradle 14 with the other end 55 of the sleeve proximate to or adjacent to the end 32 of the guide 12.

The sleeves serve to protect the optical fibers 24, cushioning the fibers against any forces that may tend to damage or break the fibers. In addition, because of the flexibility of the sleeves, bending and other flexing of the fibers can take place without damage to the fibers. Preferably the sleeves are made of a soft, flexible material with solvent resistance such as a silicone rubber having a 70 durometer hardness.

Preferably the splice connector 11 includes the outer metallic crimp housing 18 that is held in place by crimping. The housing 18 is tubular and has a sufficiently large internal diameter to slide over the assembled guide 12, cradle 14, sleeves 16, and optical fibers 24. The housing 18 is longer than the guide 12 so the guide is completely protected, but is sufficiently short that the tapered end portion 56 of each sleeve 16 extends outside of the housing 18. This allows the sleeves to flex and to help protect the fibers 24 from damage.

An adhesive is used to join the fibers together. A wide variety of adhesives can be used. Preferably a UV-curable adhesive is used. An advantage of UV-curable adhesives is that they are available as a single component system and thus mixing of adhesive in the field is not required. Further, UV-curable adhesives can be quickly cured and are available as a clear adhesive with 100% solids so that the alignment of the fibers can be viewed during assembly of a splice. A preferred adhesive is Norland 61 which is available from Norland Optical Products located in North Brunswick, New Jersey. This is a clear, colorous, 100% solids type polyurethane UV-curable adhesive.

Figure 7:
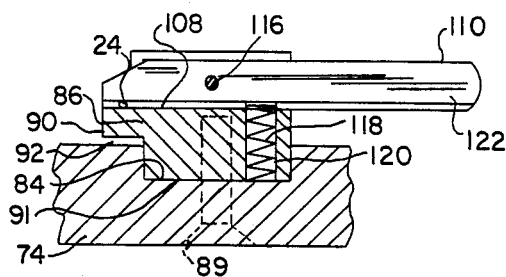
FIG. 7 is a sectional view of the fixture of FIG. 6 taken along line 7—7 in FIG. 6.
Figure 8:
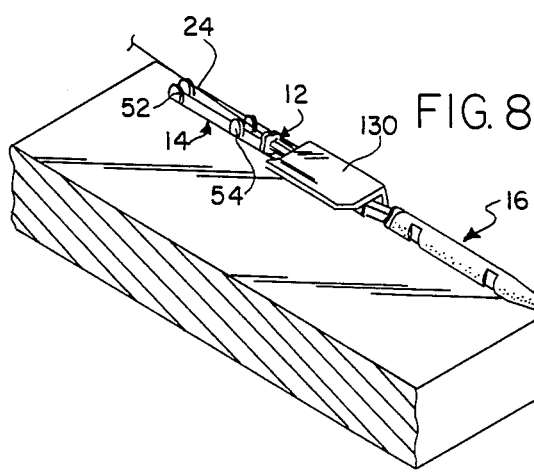
FIG. 8 is a perspective view of a portion of the fixture of FIG. 6 showing the splice of FIG. 1 almost completely assembled.

With reference to FIGS. 6–8, an apparatus or fixture 70 for assembling the splice connector 11 into a splice is shown. The fixture 70 comprises a base 72 having a bottom 74, top 76, front 78, rear 80, and opposing sides 82. A slot 84 extends across the top 76 between the sides 82. Two retaining blocks 86 are mounted in the slot 84, one adjacent each of the sides 82. Each retaining block 86 is held to the base 72 by a set screw 89 that extends upwardly through the bottom 74 of the base 72 into the bottom 91 of the retaining block 86. Each block has a forward extension 90 that is vertically spaced apart from the top 76 of the base 72, thereby forming an elongated opening or slot 92 between the extension 90 and the base 72. The front face 94 of each extension 90 has a semi-circular opening 96 therein sized to receive the end tabs 52 of the cradle 14.

A spring U-clamp 100 extends forwardly between the retaining blocks 86 and 88. The legs 102 of the spring clamp 100 are sufficiently spaced apart that the space between the legs is slightly greater than the length of the central side walls 48 of the cradle 14 so that the spring clamp 100 can fit over the side walls 48. The ends of the clamp legs 102 are mounted in a bracket 104 and are held in the bracket by a top plate 106 with a set screw 107 extending through the top plate 106 and the bracket 104 into the base 72.

The top surface 108 of both extensions 90 is not level with the top surface 76 of the base 72, but rather tapers downwardly toward the middle at an angle that is about equal to the angle that the end portions 30 and 32 of the glass guide 12 make with the central portion 28 of the guide 12. Thus, an optical fiber 24 placed on the top sloping surface 108 of the extension 90 can pass into the guide 12 without bending.

Each retaining block 86 has a lever arm 110 for holding fibers on the top surface 108 of the extension 90. Each lever arm 110 fits into a slot 112 extending from front to back in the top wall 114 of the respective retaining blocks 86. The lever arm 110 is mounted to pivot on a pin 116 that extends across the slot 112. The lever arm 110 is biased to a closed position by a compression spring 118 mounted in a hole 120 at the rear of the retaining block 86. The spring 118 presses upwardly against the bottom 122 of the lever arm 110 behind the pin 116.

In the middle of the front 78 of the base 72 there is a cut away 128 in which is mounted the bottom of an "L"-shaped spring clamp 130 held by a set screw 132. The leg 134 of the spring clamp 130 extends rearwardly toward the rear 80 of the base 72 and is spaced apart from the top 76 of the base 72.

A method for assembling the splice connector 11 using the fixture 70 will now be described.

Preferably the splice connector includes the alignment cradle 14 and the guide 12 pre-assembled as a sub-assembly 135. This sub-assembly 135 is positioned on the base 72 of the fixture 70 beneath the U-shaped hold down spring 100 with the legs 102 of the spring spanning the side walls 48 of the channel 49. In this position, the end portions 30 of the glass guide 12 are in an upright position spaced apart from the base 40 of the cradle 14, and the end tabs 52 of the alignment cradle 14 are in front of the cutouts 96 in the retaining blocks 86.

The assembly fixture 70 is steadied and with the aid of tweezers, the cradle 14 with the alignment guide 12 therein is pushed under the U-shaped spring 100 until it comes to a stop. The end tabs 52 are now in the cutouts 96 and the end portions 30 of the guide 12 are now aligned with the top slanted surface 108 of the extension 90.

The stainless steel housing 18 is slid over one of the fibers 24 and moved out of the way, as shown in FIG. 6. Then the silicone sleeves are placed over their respective fibers 24. Afterwards, the protective coating is removed from each fiber 24 exposing about 1¼ inches of the bare fiber 22. The exposed fiber ends 22 are cleaved leaving a length of about 7/16 inch from the end of the coating.

The exposed fiber ends 22 are coated with adhesive and inserted into the glass guide 12 and held in place with the clamp lever 110. The inserted fiber is adjusted so that only about 1/16 inch of the exposed fiber 22 is outside the guide 12. After one of the fibers is inserted into the guide 12, the other fiber is moved into the guide until it comes into intimate end-to-end contact with the already inserted fiber. The second fiber inserted is slid back and forth for a minimum of two cycles. The second inserted fiber is then clamped in position with the clamping lever arm 110.

If a UV-adhesive is used, a UV-light source is placed over the glass guide 12 and the adhesive is allowed to cure, usually taking about five minutes.

After curing, the fibers are released from under the clamp levers 110 and then the assembly is then slid under the forward spring holding clamp 130 as shown in FIG. 8. The sleeves 16 are then slid into location and rotated until the flat bottom surface 58 of each sleeve is against the base 40 of the cradle 14. As shown in FIGS. 3,4, and 8, the sleeves are held by the reinforcing tabs 52 and 54 of the cradle 14. Thus, the end tabs 52 serve two purposes: they help locate the guide on the fixture 70 and they hold the sleeves 16 in location on the guide.

The housing 18 is then moved to cover at least one half of the splice assembly. The partially encapsulated splice assembly is removed from the spring holding clamp 130 and then the housing is moved over the remainder of the splice assembly and centrally located exposing only the tapered ends 56 of the sleeve 16, as shown in FIG. 1. The housing is then crimped into position, thereby completing the splice.

This system for splicing optical fibers together has significant advantages. Only a simple fixture 70 is required. The components of the splice connector 11 are easy to use and easy to fabricate. A splice can rapidly and easily be made; assembly times of only three minutes, excluding the cure time, are easily achievable. Precision fiber alignment is possible; typical insertion losses are 0.3 dB multi-mode and 0.8 dB single mode. Contributing to the low light loss, the UV-curable adhesive can be index matched with the fibers. The splice is compact; typical dimensions are 2.5 inches in length and 0.125 inch in diameter. The system is useable over a wide temperature range of from −55° C. to +85° C.

The flexible sleeves provide strain relief for the fibers and the splice can be used in hazardous or high vibration areas.

Although the present invention has been described in considerable detail with reference to certain preferred versions thereof, other versions are possible. For example, the invention is useful with optical fibers that do not have a protective coating. Therefore, the spirit and scope of the appended claims should not necessarily be limited to the description of the preferred versions contained herein.

What is claimed is:

1. An apparatus for splicing a pair of optical fibers together comprising:
   a connector having:
   (a) a clear, glass, double elbow guide having a channel extending therein, the channel being adapted for receiving a pair of optical fiber cores, the guide having a straight central portion and a pair of end portions equipped with entryways, the ends of the guide being flared and extending at an obtuse angle to the central portion;
   (b) an ultraviolet-curable clear adhesive for splicing the cores together in the guide in end-to-end relationship;
   (c) an elongated alignment cradle having a longitudinal axis, end sections, and an intermediate section between the end sections and including a flat base, the intermediate section having means for holding the guide in position to receive the optical fibers with the flared ends and central portion of the guide on the base, each section of the cradle including at least one pair of opposed tabs;
   (d) a pair of flexible sleeves for placement in a respective one of the end sections of the cradle, each sleeve having a fiber receiving channel therethrough, the sleeves having a degree of flexibility that is responsive to the bending of the fibers by themselves being bent without damage to the fibers, the outer wall of each sleeve having indents corresponding to the tabs of the cradle for locating and holding the sleeves in a fixed position in the cradle relative to each other; and
   support means for said connector for supporting the optical fiber cores extending from the entryways of said guide at an angle that is equal to the angle that the end portions of the glass guide make with the central portion of the guide.

2. The apparatus of claim 1 in which each sleeve has a flat bottom and the end sections of the alignment cradle have a correspondingly flat base for receiving the bottom of each sleeve.

3. The apparatus of claim 1 in which each sleeve includes an outer end portion that extends beyond the coresponding end of the housing.

4. The apparatus of claim 3 in which the outer end portion of each sleeve is tapered narrowing away from the housing.

5. The apparatus of claim 1 including an external tubular housing sized to fit over the assembled guide, cradle, sleeves and optical fibers.

6. The apparatus of claim 5 in which the housing is a metallic housing for crimping over the splice.

7. The apparatus of claim 1 in which each end section of the cradle has at least one upstanding locating tab and each retaining block has a hole therein for receiving such a tab for locating and holding the cradle fixed in a predetermined position.

8. The apparatus of claim 7 in which each extension has an upper surface and each retaining block includes clamp means for clamping an optical fiber on the upper surface of the extension.

9. The apparatus of claim 8 in which each upper surface slopes downwardly toward the middle portion.

10. The apparatus of claim 1 wherein the support means comprises:
    (a) a base having side sections and a middle sections between the side sections;
    (b) a retaining block at each side section of the bse, each block including an extension extending over and spaced apart from the base forming an opening for receiving the end sections of the cradles; and
    (c) holding means on the base in the middle section of the base for engaging the intermediate section of the cradle for holding the cradle in position on the base.

11. The apparatus of claim 10 in which each intermediate section of the cradle has upstanding walls for holding the guide, and wherein the holding means comprises a U-shaped spring clamp having parallel arms, the arms being spaced apart from each other by a distance greater than the length of the walls.

12. A method for splicing a pair of optical fibers together, the fibers comprising a protective coating, the method comprising the step of:
(a) placing a flexible sleeve having a fiber receiving channel therethrough over each of the fibers, the sleeves having a degree of flexiblity that is responsive to the bending of the fibers by themselves being bent without damage to the fibers, each sleeve having at least one locating element on its outer wall;
(b) placing a tubular housing sized to fit over the sleeves onto one of the fibers;
(c) removing the coating from an end portion of each fiber leaving a bare fiber;
(d) selecting as alignment cradle having end sections and an intermediate section between the end sections, the intermediate section holding a guide having a fiber-receiving channel attending therein, the guide having a straight central portion and a pair of end portions extending at an obtuse angle to the central portion, the cradle having locating elements corresponding to the sleeve locating elements;
(e) placing each bare fiber in the guide with the fibers in end-to-end relationship;
(f) bonding the fibers together in the guide;
(g) supporting the optical fibers extending from the guide during the steps (a) through (f) at an angle that is equal to the angle that the end portions of the guide make with the central portion of the guide;
(h) after bonding, sliding the flexible sleeves over the respective fibers and placing the sleeves in the respective end sections of the alignment cradle at fixed positions determined by the cradle locating elements and the sleeve locating elements so that the sleeves are fixed relative to each other; and
(i) sliding the housing over the assembled fibers, guide sleeves and alignment cradle with an end of each sleeve extending beyond the corresponding end of the housing.

13. The method of claim 12 including the step of crimping the housing after the step of sliding the housing.

14. The method of claim 12 in which the step of bonding comprises placing a UV-curable adhesive on the fibers and exposing the adhesive to UV-light.

* * * * *